Patented Sept. 15, 1925.

1,554,027

UNITED STATES PATENT OFFICE.

HANS POTRATZ, OF WERCHOW, NEAR CALAU, GERMANY, ASSIGNOR TO NIEDERLAUSITZER-BAD-REICHENHALLER CHEMISCHE WERKE "NIBRAG" A. G., OF BERLIN, GERMANY, A CORPORATION OF GERMANY.

ISOTONIC SOLUTION.

No Drawing. Application filed June 6, 1924. Serial No. 718,331.

*To all whom it may concern:*

Be it known that I, HANS POTRATZ, a citizen of the German Republic, residing at Werchow, near Calau, Germany, have invented certain new and useful Improvements in Isotonic Solutions, of which the following is a specification.

This invention relates to new or improved compositions of matter, to wit, isotonic solutions.

It is now recognized as a fact that the osmotic effect of inorganic salt solutions plays an important part in the action of such solutions on living organisms. Osmosis initiates stimulation of the organisms and so influences the physiological functioning of individual organs, particularly in the case of certain groups of cells, that absorption of specific substances by these groups is encouraged by what may be termed a reflex action.

Isotonic or isosmotic solutions of specific substances have the property of increasing the power possessed by the membrane of cells to exercise selective absorption of, or permeability to, the ions. Furthermore, it may be assumed that pathological changes in the cell tissues are not without effect on the osmotic process and this is confirmed by the selective capacity possessed by certain substances for depositing upon diseased tissues or membranes.

This invention consists in producing an isotonic salt by preparing a solution of an indifferent salt, such as a solution of common salt sodium chlorid, corresponding to an osmotic pressure of one atmosphere and mixing such salt solution with a solution of certain cerium-halogen salts of the same osmotic pressure as the solution of the indifferent salt. As a result, there is a formation of compounds which are capable of chemico-therapeutic action on septic places and on tissues that have suffered pathological change or bacterial infection. In effect, the tissues selectively absorb the cerium-halogen compounds and the symptoms of disease are thereby allayed. Isotonic solutions of common salt and cerium-iodine compounds, for example (that is to say, solutions which are of the same isotonic strength), are non-poisonous, whereas cerium salts alone have a poisonous action. Furthermore, the said isotonic solutions may be introduced by subcutaneous injection without distressing the patient.

An example of the carrying out of the process is as follows:—

Dissolve .2611 gr. of pure common salt in 100 c. cm. of re-distilled water and mix therewith 2.3259 gr. of cerium iodide $CeI_3$ in 100 c. cm. of re-distilled water. Heat this mixed solution to a temperature of 65° C. for approximately 45 to 60 minutes, and the product is a sterilized isotonic solution.

Similar solutions may be produced by the mixing of solutions of cerous chlorides (cerium and chlorine compounds) with other indifferent salt solutions.

It is essential that the solutions combined in the manner aforesaid be isotonic and at an osmotic pressure of one atmosphere if required for immediate use. When the combined solutions are intended for storage before use they can be adjusted to an osmotic pressure of several atmospheres, and this pressure can be reduced subsequently to an osmotic pressure of one atmosphere by corresponding dilution.

The term "indifferent salt solutions" is intended to cover solutions capable of being injected subcutaneously with safety when present in isotonic solutions. In addition to common salt, which is given as an example, alkali sulphates, alkali phosphates and the like may be used, but in practice common salt is generally recommended. However, it is possible to produce a satisfactory solution in accordance with the invention by employing mixed solutions of sodium iodide and cerium chloride. When employing a solution of cerium iodide, the iodine is active as well as the cerium and the latter is probably concerned with all septic processes in the body. If cerium chloride is employed, it is possible that the action of the cerium is unsupported by any action of the iodine. The "indifferent salts" are of course those which are not substantially acid or alkaline, nor which are poisonous nor which react chemically upon the cerium compound used, nor which react to produce changes in the blood.

I claim:

1. A new composition of matter, to wit, an isotonic solution, comprising in combination a salt solution and a solution of a cerium compound, said solutions being of the same osmotic pressure substantially as set forth.

2. A new composition of matter, to wit, an isotonic solution, comprising in combination a solution of common salt and a solution of a cerium compound, said solutions being of the same osmotic pressure substantially as set forth.

3. A new composition of matter, to wit, an isotonic solution, comprising in combination a solution of common salt and a solution of a cerium halogen compound, said solutions being of the same osmotic pressure substantially as set forth.

4. A new composition of matter, to wit, an isotonic solution, comprising in combination a solution of an indifferent salt and a solution of a cerium iodine compound, said solutions being of the same osmotic pressure substantially as set forth.

5. A new composition of matter, to wit, an isotonic solution, comprising in combination a solution of common salt and a solution of a cerium-iodine compound, said solutions being of the same osmotic pressure substantially as set forth.

6. A new composition of matter, to wit, an isotonic solution, comprising in combination a solution of an indifferent salt having an osmotic pressure equal to one atmosphere and a solution of a cerium-halogen salt having an osmotic pressure equal to one atmosphere substantially as set forth.

7. A new composition of matter, to wit, an isotonic solution, comprising in combination a solution of an indifferent salt having an osmotic pressure equal to a multiple of one atmosphere and a solution of a cerium-halogen salt having an osmotic pressure equal to the same multiple as aforesaid, substantially as set forth.

8. A new composition of matter, to wit a sterilized isotonic solution comprising in combination a salt solution and a solution of a cerium compound, said solutions being of the same osmotic pressure substantially as set forth.

HANS POTRATZ.